(12) United States Patent
Kim (10) Patent No.: US 11,385,808 B2
(45) Date of Patent: Jul. 12, 2022

(54) MEMORY PERFORMING DEFRAGMENTATION OPERATION USING DATA COLLECTING AREA AND METHOD OF OPERATING THE SAME

(71) Applicant: SK hynix Inc., Gyeonggi-do (KR)

(72) Inventor: Da Hoo Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 3 days.

(21) Appl. No.: 17/029,765

(22) Filed: Sep. 23, 2020

(65) Prior Publication Data
US 2021/0373783 A1 Dec. 2, 2021

(30) Foreign Application Priority Data
Jun. 2, 2020 (KR) ........................ 10-2020-0066482

(51) Int. Cl.
*G06F 3/06* (2006.01)

(52) U.S. Cl.
CPC ............ *G06F 3/0622* (2013.01); *G06F 3/064* (2013.01); *G06F 3/067* (2013.01); *G06F 3/0614* (2013.01); *G06F 3/0629* (2013.01); *G06F 3/0659* (2013.01); *G06F 3/0679* (2013.01); *G06F 2206/1004* (2013.01)

(58) Field of Classification Search
None
See application file for complete search history.

(56) References Cited

U.S. PATENT DOCUMENTS

| | | | |
|---|---|---|---|
| 6,038,636 A * | 3/2000 | Brown, III | G06F 12/0246 711/103 |
| 8,347,055 B2 | 1/2013 | Donatiello | |
| 2020/0401557 A1* | 12/2020 | Struyve | G06F 3/0643 |
| 2020/0409841 A1* | 12/2020 | Nilsen | G06F 9/5027 |

* cited by examiner

*Primary Examiner* — Edward J Dudek, Jr.
*Assistant Examiner* — Ralph A Verderamo, III
(74) *Attorney, Agent, or Firm* — IP & T Group LLP (57) ABSTRACT

A method of operating a memory comprises reading a first node including first data and a first link; writing the first data to a data collecting area; updating a first collecting link of the first data, which is written in the data collecting area to a position in the data collecting area; reading a second node corresponding to the first link, the second node including second data and a second link; and writing the second data to a position in the data collecting area, which is designated by the first collecting link.

16 Claims, 7 Drawing Sheets

MEMORY PERFORMING DEFRAGMENTATION OPERATION USING DATA COLLECTING AREA AND METHOD OF OPERATING THE SAME

CROSS-REFERENCE TO RELATED APPLICATION

The present application claims priority to Korean Patent Application No. 10-2020-0066482, filed on Jun. 2, 2020, which is herein incorporated by reference in its entirety.

BACKGROUND

1. Field

The disclosure relates to memories.

2. Description of the Related Art

Big data involves analysis of large amounts of data, for which data processing becomes more involved for various database applications. Data is managed in a data structure type suited for its usage. In general, there are two types of data structures: array type and linked type.

Figure 1:
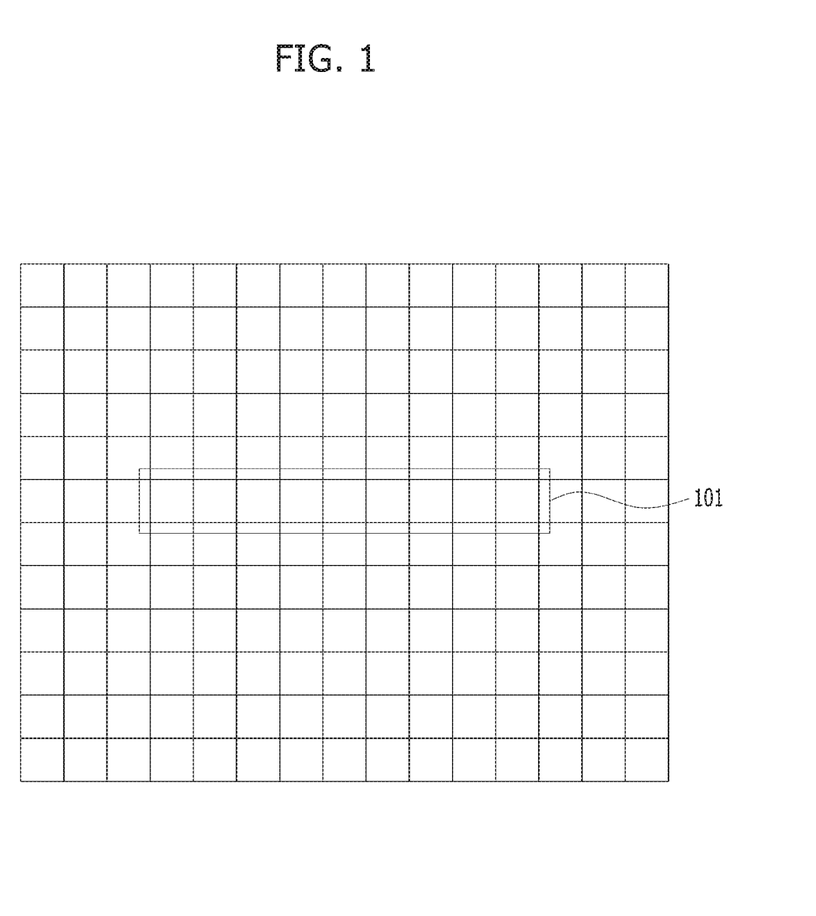
FIG. 1 is a diagram illustrating an example in which data is stored in a cell array of a memory in an array type data structure.

In an array type data structure a specific size of area may be previously secured from a memory, and data is stored only in that area for future use. FIG. 1 is a diagram illustrating an example in which data is stored in a cell array of a memory in the array type data structure. In FIG. 1, 101 denotes the area where the data is stored.

Figure 2:
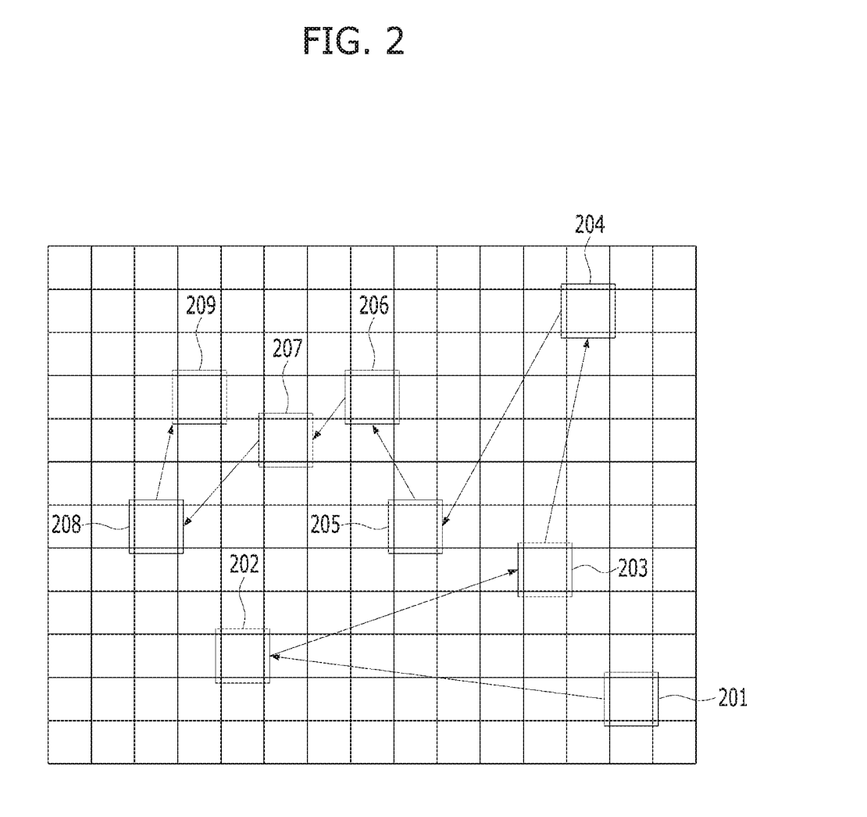
FIG. 2 is a diagram illustrating an example in which data is stored in a cell array of a memory in a linked type data structure.
Figure 3:
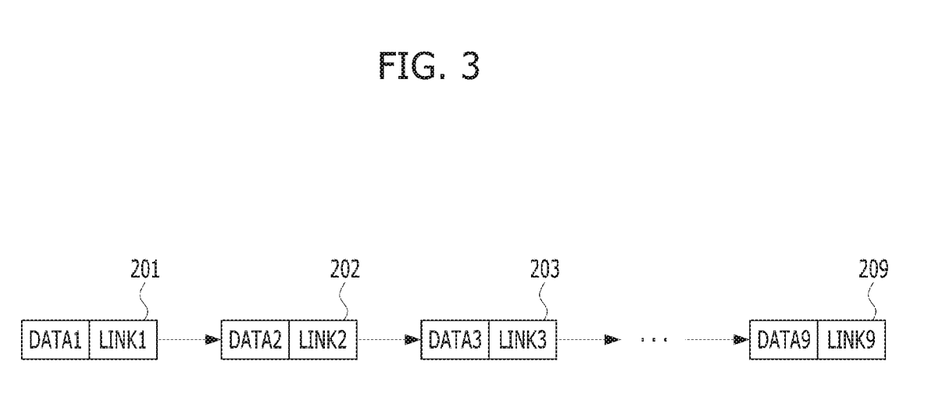
FIG. 3 is a diagram illustrating internal contents of nodes in a linked type data structure.

In a linked type data structure type information about how data items are associated with their predecessor or successor data items are stored along with the data items. Linked data structures have data items linked together via the addresses of their predecessors or successors and allow more data items to be added simply by changing addresses, thus eliminating the need for previously designating a data size for use while enabling a quick adding and deleting of data items. Thus, linked data structures may be more appropriate for processing of big data, the field of which is rapidly growing. FIG. 2 is a diagram illustrating an example in which data is stored in a cell array of a memory in a linked type data structure. In FIG. 2, 201 to 209 denote nodes linked together. It may be seen from FIG. 2 that the nodes 201 to 209 are dispersed in different areas of the memory. FIG. 3 is a diagram illustrating the internal contents of the nodes 201 to 209. The nodes 201 to 209 may include data items DATA1 to DATA9, respectively, and links LINK1 to LINK9, respectively, each of which indicates the place of its successor data item.

In the linked type, data items are dispersed in different areas as shown in FIG. 2. Thus, it may take a long time to search for the successor data item by referencing the link inside the node, making cache miss more likely, and thus adversely affecting performance.

SUMMARY

According to embodiments of the disclosure, a technique for preventing system performance deterioration using a linked type data structure is provided.

According to an embodiment of the disclosure, a method of operating a memory comprises reading a first node including first data and a first link; writing the first data to a data collecting area; updating a first collecting link of the first data, which is written in the data collecting area to a position in the data collecting area; reading a second node corresponding to the first link, the second node including second data and a second link; and writing the second data to a position in the data collecting area, which is designated by the first collecting link.

According to an embodiment of the disclosure, a memory comprises a normal area including a plurality of memory cells; a data collecting area including a plurality of memory cells; and a defragmentation circuit reading a plurality of data linked from the normal area, writing the plurality of data to the data collecting area, and controlling the normal area and the data collecting area to update links to enable the plurality of data written to the data collecting area to be linked in the data collecting area.

According to an embodiment of the disclosure, a memory comprises a memory cell array including a normal area and a data collecting area, the normal area storing multiple dispersed nodes including a first node and a second node, the first node being linked to the second node, a size of the data collecting being less than that of the normal area; and a circuit configured to read data of the first node from the normal area, write the data of the first node in a first region of the data collecting area, link the first region to a second region adjacent to the first region, read data of the second node from the normal area and write the data of the second node in the second region.

According to embodiments of the disclosure, it is possible to prevent system performance deterioration in use of a linked type of data structure.

DETAILED DESCRIPTION

Hereinafter, embodiments of the disclosure are described below in detail with reference to the accompanying drawings to allow one of ordinary skill in the art to readily practice the invention. Well known components and information may be omitted from the description below. The same or substantially the same reference notations are used to refer to the same or substantially the same elements throughout the specification and the drawings. Also, throughout the specification, reference to "an embodiment," "another embodiment" or the like is not necessarily to only one embodiment, and different references to any such phrase are not necessarily to the same embodiment(s). The term "embodiment" when used herein does not necessarily refer to all embodiments.

Figure 4:
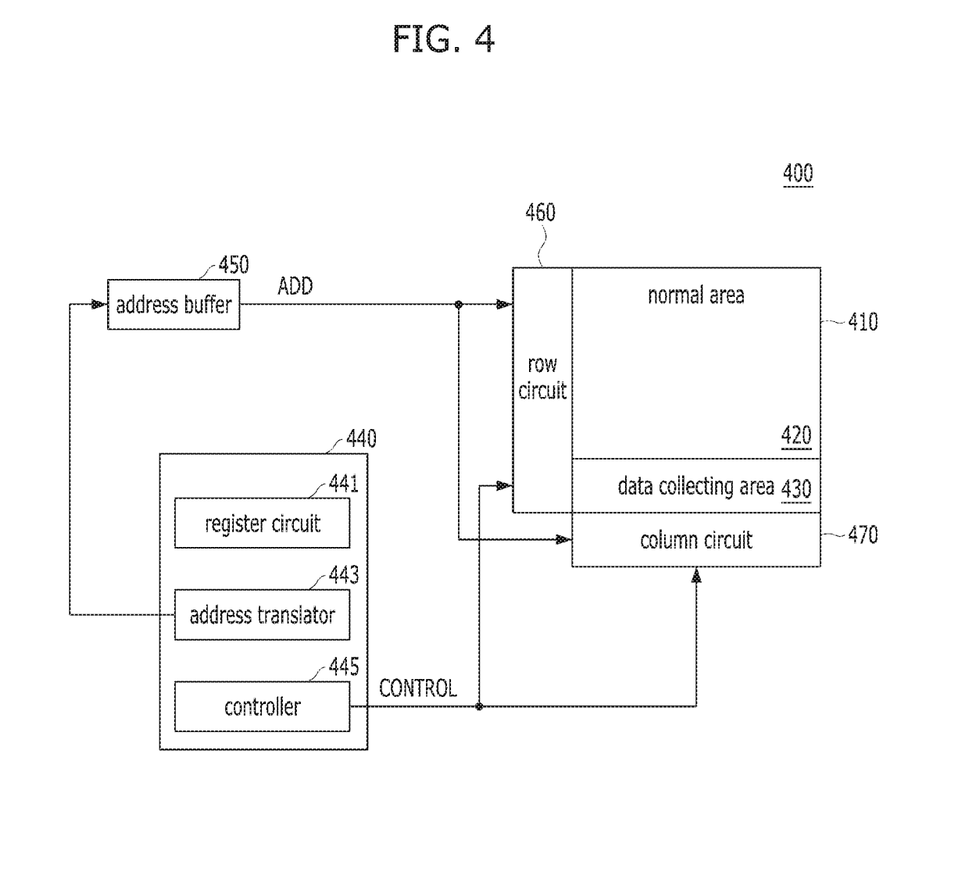
FIG. 4 is a diagram illustrating a configuration of a memory according to an embodiment of the disclosure.

FIG. 4 is a diagram illustrating a configuration of a memory 400 according to an embodiment of the disclosure.

Referring to FIG. 4, the memory 400 may include a cell array 410 including a normal area 420 and a data collecting area 430, a defragmentation circuit 440, an address buffer 450, a row circuit 460, and a column circuit 470.

The cell array 410 may include the normal area 420 and the data collecting area 430. The data collecting area 430 may be an area in which the defragmentation circuit 440 collects data, which are dispersed and stored in the normal area 420 by a defragmentation operation. The remaining areas not designated as the data collecting area 430 may belong to the normal area 420.

The row circuit 460 and the column circuit 470 may be circuits used to access memory cells selected by addresses ADD in the cell array 410. In the cell array 410, memory cells corresponding to a row selected by the row circuit 460 and columns selected by the column circuit 470 may be accessed.

The defragmentation circuit 440 may perform a defragmentation operation to collect data, which are dispersed and stored in the normal area 420, and transfer or move such data into the data collecting area 430. The defragmentation circuit 440 may include a register circuit 441, an address translator 443, and a controller 445.

Figure 5:
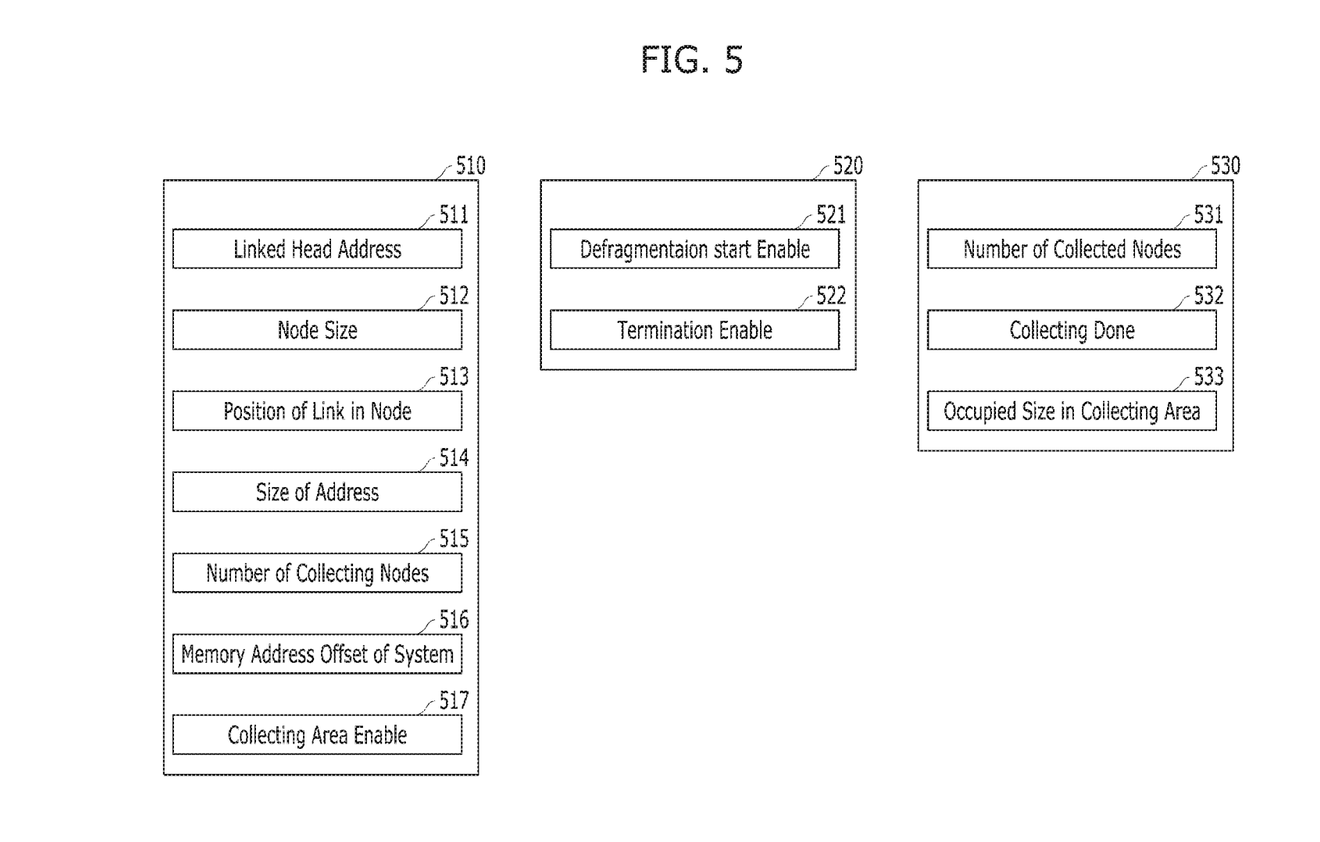
FIG. 5 is a diagram illustrating a configuration of a register circuit.

The register circuit 441 may store information related to the defragmentation operation. FIG. 5 illustrates an example of the register circuit 441. Referring to FIG. 5, the register circuit 441 may include a configuration register 510, an operation control register 520, and a result register 530.

The configuration register 510 may store configuration information. The configuration register 510 may include head address information (Linked Head Address) 511, node size information (Node Size) 512, information indicating the position of the link in the node, i.e., Position of Link in Node 513, information indicating the address size of the link, i.e., Size of Address 514, information indicating the number of nodes to be collected, i.e., Number of Collecting Nodes 515, system memory address offset information, i.e., Memory Address Offset of System 516, and data collecting area enable information, i.e., Collecting Area Enable 517. The head address information 511 pertains to the address of a first node among nodes to be collected into the data collecting area 430. The node size information 512 may indicate the size of one node. One node may include data and a link. The node size information 512 may indicate the total size of the node including the data and the link. Position of Link in Node information 513 may indicate the position of the link in a node. Size of Address information 514 may indicate the size of valid addresses in the link in the position indicated by the information 513. Number of Collecting Nodes information 515 may indicate the number of nodes to be collected by the defragmentation circuit 440. Memory Address Offset of System information 516 may indicate an offset between the address stored in the link and the address of the memory 400. The addresses stored in the link may be a system address and may include the addresses of all devices capable of storing data in a system, such as a memory, hard disk drive (HDD), or solid-state drive (SSD). Memory Address Offset of System information 516 may indicate the range of addresses of the memory 400 in the system address. Collecting Area Enable information 517 is information to enable to secure the data collecting area 430. When the information 517 is enabled, the data collecting area 430 may be secured. When the information 517 is disabled, there may be no data collecting area 430 in the cell array 410, and all of the areas in the cell array 410 may belong to the normal area 420. The information 511 to 517 of the configuration register 510 may be configured by a memory controller to control the memory 400.

The operation control register 520 may store operation control information. The operation control register 520 may store defragmentation start enable information 521 and defragmentation termination enable information 522. The defragmentation start enable information 521 may be information to enable the defragmentation operation of the memory 400 to start. When the defragmentation start enable information 521 is enabled, the memory 400 may start the defragmentation operation. The defragmentation start enable information 521 may be configured by the memory controller. The memory controller may enable the defragmentation start enable information 521 during a period when the memory 400 need not be accessed, thereby enabling the defragmentation operation to start. The defragmentation termination enable information 522 may be information to terminate the defragmentation operation of the memory 400. When the defragmentation termination enable information 522 is enabled while the defragmentation operation of the memory 400 is performed, the defragmentation operation may be stopped. The defragmentation termination enable information 522 may be configured by the memory controller. The memory controller may enable the defragmentation termination enable information 522 when the memory 400 need be accessed while the defragmentation operation of the memory 400 is performed.

The result register 530 may store result information. The result register 530 may store information (indicating the number of nodes collected, i.e., Number of Collected Nodes 531, collecting complete information, i.e., Collecting Done 532, and data collecting area use information, i.e., Occupied Size in Collecting Area 533 Number of Collected Nodes information 531 may indicate how many nodes have been collected by the defragmentation operation. In other words, the information 531 may indicate the progress of the defragmentation operation. The collecting complete information 532 may indicate whether or not the defragmentation operation has been completed. The data collecting area use information 533 may indicate how much the data collecting area 430 has been used. The result register 530 may store information 531, 532, and 533 related to the results of the progress of the defragmentation operation. Since the defragmentation operation is performed under the control of the controller 445, the information 531, 532, and 533 stored in the result register 530 may be updated by the controller 445.

Referring back to FIG. 4, the address translator 443 of the defragmentation circuit 440 may translate the system address into the memory address. The links included in the nodes read from the normal area 420 are system addresses. Thus, these system addresses may need to be translated (or mapped) to memory addresses for access to the memory 440. The head address information 511 is a system address as well. Thus, to access the first node in the normal area 420 using the head address, the head address, which is a system address, may need to be translated into a memory address using the address translator 443.

The controller 445 may control the components within the defragmentation circuit 440, as well as components external thereto, to perform the defragmentation operation. In FIG. 4, CONTROL may denote the control by the controller 445. How the defragmentation operation is performed under the control of the controller 445 is described below with reference to the drawings.

The address buffer 450 may store the memory address resultant from translation by the address translator 443. The address ADD stored in the address buffer 450 may be used to access the cell array 410.

The memory 400 may be a main memory, e.g., a dynamic random-access memory (DRAM). However, in another embodiment, the memory 400 may be a different kind of memory.

Figure 6:
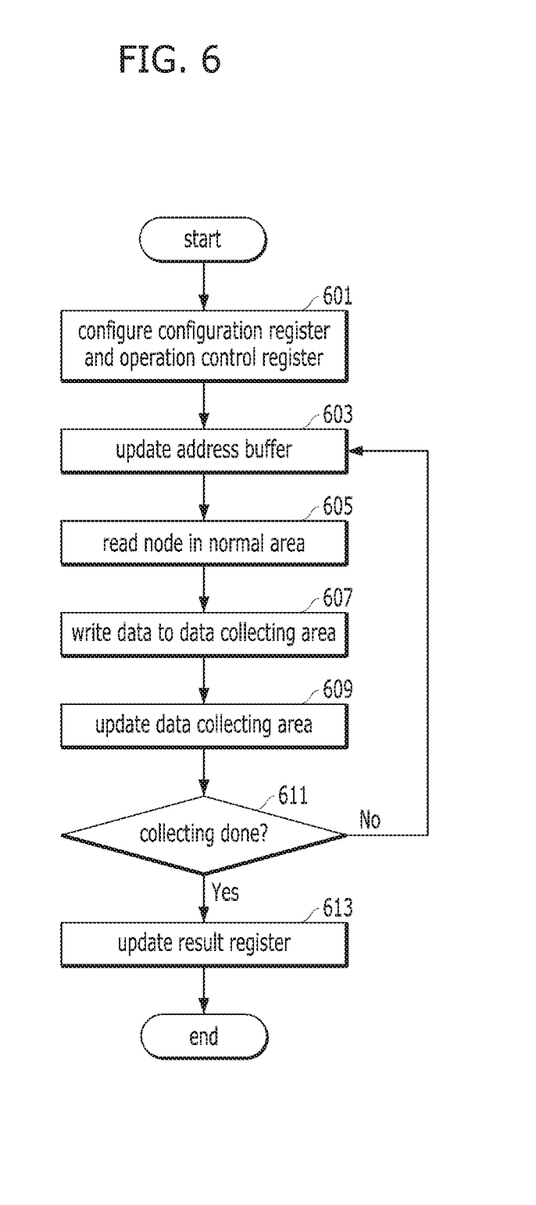
FIG. 6 is a diagram illustrating an example defragmentation operation of a memory.

FIG. 6 is a diagram illustrating an example defragmentation operation of a memory 400.

Referring to FIG. 6, the configuration register 520 and operation control register 530 of the register circuit 441 may be configured by the memory controller (601). In particular, a defragmentation operation may be started as the defragmentation start enable information 521 of the operation control register 530 is enabled.

The address buffer 450 may be updated (603). The head address information 511 of the configuration register 520 may be translated into a memory address by the address translator 443, and the address buffer 450 may be updated with the memory address.

The node of the normal area 420 may be read using the address ADD stored in the address buffer 450 (605). The node may include data and a link.

The node data read in operation 605 may be written to the data collecting area 430 (607). The link corresponding to the data stored in the data collecting area 430 may be updated (or written) (609). The link updated in operation 609 may designate a position, preferably an immediately adjacent position, in the data collecting area 430. When the link included in the node read in operation 605 designates no position in the memory 400, the link updated in operation 609 may be identical to the link read in operation 605.

It may be determined whether collecting is done (or completed) (611). Collecting may be determined to be completed when any one of the following three conditions is met: (1) when the same number of nodes as that indicated by the Number of Collecting Node information 515 are collected into the data collecting area 430; (2) when the defragmentation termination enable information 522 of the operation control register 520 is enabled; and/or (3) when the link in the node read in operation 605 designates no position in the memory 400. Since (1) indicates that all data has been collected, (2) indicates that the defragmentation operation has been instructed to stop by the memory controller, and (3) indicates that no further data collecting is possible, collecting may be determined to be completed when any one of conditions (1) to (3) is met.

Unless collecting is determined to be done (No in 611), operations 603 to 611 may be performed again. When operation 603 is performed again, the link of the node read in operation 605 may be translated by the address translator 443 and be then updated to the address buffer 450.

When collecting is determined to be completed (Yes in 611), the result register 530 may be updated by the controller 445 (613).

Figure 7:
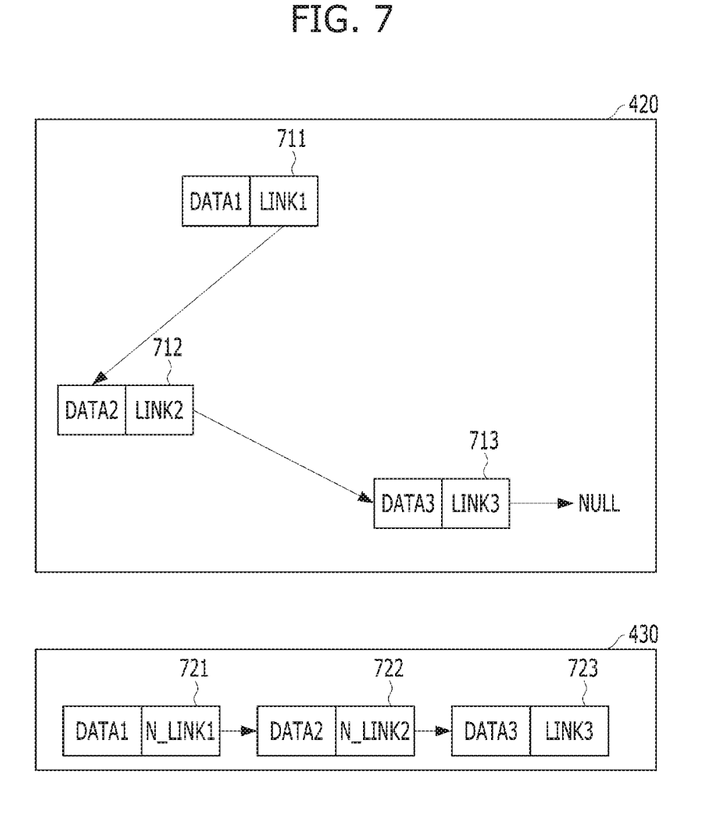
FIG. 7 is a diagram illustrating an example in which three nodes dispersed in a normal area are collected into a data collecting area.

FIG. 7 is a diagram illustrating an example in which three nodes dispersed in a normal area 420 are collected into a data collecting area 430. A process in which nodes are collected is described with reference to FIGS. 6 and 7.

The head address information 511 may be translated by the address translator 443 and updated to the address buffer 450 (603), and the node 711 of the normal area 420 may be read by the address ADD stored in the address buffer 450 (605). The data DATA1 of the node 711 may be written to the node 721 of the data collecting area 430 (607). The link N_LINK1 of the node 721 may be updated to designate an immediately adjacent area in the data collecting area 430 (609). It may be seen from FIG. 7 that the link LINK1 of the node 711 differs from the link N_LINK1 of the node 721. Although the node 711 is collected from the data collecting area 430, the node 711, may remain, as is, in the normal area 420.

Thereafter, the link LINK1 of the node 711 may be translated by the address translator 443 and updated to the address buffer 450 (603), and the node 712 of the normal area 420 may be read by the address ADD stored in the address buffer 450 (605). The data DATA2 of the node 712 may be written to the node 722 of the data collecting area 430 (607). The link N_LINK2 of the node 722 may be updated to designate an immediately adjacent area in the data collecting area 430 (609). The link LINK1 of the node 711 differs from the link N_LINK2 of the node 722 and, although the node 712 is collected from the data collecting area 430, the node 712 may remain, as is, in the normal area 420.

Thereafter, the link LINK2 of the node 712 may be translated by the address translator 443 and updated to the address buffer 450 (603), and the node 713 of the normal area 420 may be read by the address ADD stored in the address buffer 450 (605). The data DATA3 of the node 713 may be written to the node 723 of the data collecting area 430 (607). The link LINK3 of the node 713 is marked as NULL which means that the link LINK3 designates no area inside the memory 400. In other words, in this case, the link LINK3 may designate an area, such as of an HDD or SDD, other than the memory 400, or may designate no area (in the case where the node 713 is the last node of the linked nodes). In this case, the link LINK3 of the node 723 of the data collecting area 430 may be updated in the same manner as the link LINK3 of the node 713. Since the link LINK3 designates no area in the memory 400, the defragmentation operation may be terminated.

It may be seen from FIG. 7 that the nodes 711 to 713, which used to be dispersed in the normal area 420, are gathered (or collected) in the data collecting area 440. Such a defragmentation operation may reduce the time of search for the data collected in the data collecting area 430 while increasing a chance of cache hit.

While the present invention has been illustrated and described in connection with various embodiments, such description is provided by way of example; it is not intended to limit the invention. It should be appreciated by one of ordinary skill in the art that various changes may be made to any of the disclosed embodiments within the spirit and scope of the disclosure. The invention encompasses all such changes that fall within the scope of the claims.

What is claimed is:

1. A method of operating a memory, the method comprising:

reading a first node including first data and a first link;

writing the first data to a data collecting area;

updating a first collecting link of the first data, which is written in the data collecting area to a position in the data collecting area;

reading a second node corresponding to the first link, the second node including second data and a second link; and writing the second data to a position in the data collecting area, which is designated by the first collecting link.

2. The method of claim 1, further comprising updating a second collecting link of the second data, which is written in the data collecting area, to a position in the data collecting area.

3. The method of claim 1, further comprising:
identifying that the second link designates no position in the memory; and
updating a second collecting link of the second data, which is written in the data collecting area, to the same value as the second link.

4. The method of claim 2, further comprising:
reading a third node corresponding to the second link, the third node including third data and a third link; and
writing the third data to a position designated by the second collecting link in the data collecting area.

5. The method of claim 4, further comprising updating a third collecting link of the third data, which is written in the data collecting area, to a position in the data collecting area.

6. The method of claim 4, further comprising:
identifying that the third link designates no position in the memory; and
updating a third collecting link of the third data, which is written in the data collecting area, to the same value as the third link.

7. The method of claim 1, further comprising:
before reading the first data,
securing the data collecting area; and
determining to perform defragmentation.

8. A memory, comprising:
a normal area including a plurality of memory cells;
a data collecting area including a plurality of memory cells; and
a defragmentation circuit reading a plurality of data linked from the normal area, writing the plurality of data to the data collecting area, and controlling the normal area and the data collecting area to update links to enable the plurality of data written to the data collecting area to be linked in the data collecting area,
wherein the defragmentation circuit:
reads a first node from the normal area, the first node including first data and a first link;
writes the first data to the data collecting area;
updates a first collecting link of the first data, which is written in the data collecting area to a position in the data collecting area;
reads a second node corresponding to the first link from the normal area, the second node including second data and a second link; and
writes the second data to a position designated by the first collecting link in the data collecting area.

9. The memory of claim 8,
wherein the defragmentation circuit updates a second collecting link of the second data, which is written in the data collecting area, to a position in the data collecting area.

10. A memory, comprising:
a normal area including a plurality of memory cells;
a data collecting area including a plurality of memory cells; and
a defragmentation circuit reading a plurality of data linked from the normal area, writing the plurality of data to the data collecting area, and controlling the normal area and the data collecting area to update links to enable the plurality of data written to the data collecting area to be linked in the data collecting area,
wherein the defragmentation circuit includes:
a register circuit for storing information related to a defragmentation operation;
an address translator for translating a link read from the normal area to a memory address; and
a controller for controlling the defragmentation operation.

11. The memory of claim 10,
wherein the register circuit includes:
a configuration register for storing configuration information;
an operation control register for storing operation control information; and
a result register for storing result information.

12. The memory of claim 11,
wherein the configuration information includes:
linked head address information corresponding to an address of a head node among a plurality of nodes linked in the normal area;
node size information;
information indicating a position of a link in a node;
information indicating an address size in a link;
information indicating a number of nodes to be collected;
system memory address offset information; and
data collecting area enable information.

13. The memory of claim 11,
wherein the operation control information includes:
defragmentation start enable information; and
defragmentation termination enable information.

14. The memory of claim 11,
wherein the result information includes:
information indicating a number of nodes collected;
information indicating that collection is complete; and
data collecting area use information.

15. The memory of claim 10, further comprising an address buffer for storing the memory address translated by the address translator.

16. A memory comprising:
a memory cell array including a normal area and a data collecting area, the normal area storing multiple dispersed nodes including a first node and a second node, the first node being linked to the second node, a size of the data collecting being less than that of the normal area; and
a circuit configured to read data of the first node from the normal area, write the data of the first node in a first region of the data collecting area, link the first region to a second region adjacent to the first region, read data of the second node from the normal area and write the data of the second node in the second region.

* * * * *